(12) United States Patent
Lee et al.

(10) Patent No.: US 9,287,737 B2
(45) Date of Patent: Mar. 15, 2016

(54) CORE MODULE FOR WIRELESS SENSING SYSTEM

(71) Applicant: Shuenn-Yuh Lee, Tainan (TW)

(72) Inventors: Shuenn-Yuh Lee, Tainan (TW); Cheng-Pin Wang, Kaohsiung (TW)

(73) Assignee: Shuenn-Yuh Lee, Tainan (TW)

( * ) Notice: Subject to any disclaimer, the term of this patent is extended or adjusted under 35 U.S.C. 154(b) by 360 days.

(21) Appl. No.: 13/904,026

(22) Filed: May 29, 2013

(65) Prior Publication Data

US 2014/0232207 A1    Aug. 21, 2014

(30) Foreign Application Priority Data

Feb. 18, 2013   (TW) .............................. 102105453 A

(51) Int. Cl.
*H02J 17/00* (2006.01)
*H04B 5/00* (2006.01)

(52) U.S. Cl.
CPC .............. *H02J 17/00* (2013.01); *H04B 5/0031* (2013.01); *H04B 5/0037* (2013.01); *H04B 5/0043* (2013.01); *H04B 5/0062* (2013.01)

(58) Field of Classification Search
None
See application file for complete search history.

(56) References Cited

U.S. PATENT DOCUMENTS

| 2005/0185737 | A1* | 8/2005 | Yamauchi | H04L 1/206 375/316 |
| 2008/0252459 | A1* | 10/2008 | Butler | G06K 7/0008 340/572.1 |
| 2009/0227214 | A1* | 9/2009 | Georgantas | H04B 1/30 455/86 |
| 2013/0300643 | A1* | 11/2013 | Pedersen | G06F 3/01 345/156 |

* cited by examiner

*Primary Examiner* — Jared Fureman
*Assistant Examiner* — Aqeel Bukhari
(74) *Attorney, Agent, or Firm* — Chun-Ming Shih

(57) ABSTRACT

A core module of wireless sensing system is provided for receiving, processing and delivering environmental information, inclusive of a RF front-end circuit, a power control circuit, an analog front-end detection circuit and a baseband signal processor. A SOC (System on Chip) may be designed by including an electronic tag antenna, an impedance variation circuit and a sensor to form the wireless sensing system with the combination of a remote reader, such that the core module may be applied for wirelessly sensing the environmental information, such as physiological information of human heartbeat response, to achieve the effect of compactness, power saving and error detection.

9 Claims, 3 Drawing Sheets

CORE MODULE FOR WIRELESS SENSING SYSTEM

BACKGROUND OF THE INVENTION

1. Field of the Invention

The invention relates to a core module for wireless sensing system to sense, process and output environmental information.

2. Descriptions of the Related Art

In recent years, with the mature development of health care system, the requirement of physiological signal detection wireless network system increases day by day. For the communication between the detection device on human body side and the health care monitoring processor, the wireless communication method is usually necessary to implement the communication between the two devices for the convenient action of patient.

Among conventional portable wireless communication devices, the wireless network devices of existing standards, such as WiFi, Bluetooth, ZigBee etc. are adopted primarily, but their power consumption is usually too large to meet the requirement of physiological signal wireless transmission. The key factor to determine the length of the usage time for portable devices is the power consumption of the wireless RF (radiation frequency) transmission circuit. However, the power consumption of the RF IC, for example power amplifier, in a conventional wireless network device may shorten the usage time of a portable device. Therefore, there is an opportunity for a wireless RF system with low power consumption to be used widely in portable wireless communication devices and applied to the wireless transmission of physiological signals. Additionally, because there are always many unpredictable reasons that may result in erroneous transmitted information when an external network and a detection device transmit instructions and data with each other, while existing physiological signal wireless detection systems do not regulate communication protocol and error detection mechanism strictly, the information transmitted between systems with each other cannot be guaranteed to be the user owned physiological information.

Further, for RF circuits, sensor circuits, digital circuits, analog circuits and power management circuits of existing wireless communication devices used for wireless sensing systems, if they are assembled with discrete components, the wireless communication device will be too large and heavy to be portable and wearable; nevertheless, if they are integrated on a single chip, the larger the number of component types in a circuit will induce in poor yield and further result in more expensive products.

Thus, existing wireless communication devices have shortages, such as high power consumption, unstable data transmission and low yield etc. in the wireless sensing applications that extract environmental or physiological information. It is the objective that those skilled in the art desire to achieve urgently about how to solve or reduce these shortages to provide better user experiences.

SUMMARY OF THE INVENTION

In view of the shortages of high power consumption, unstable data transmission and low yield of conventional wireless communication devices in wireless sensing fields, the inventor of the invention has paid much attention to the development of a core module for wireless sensing system, which may be used to receive, process and output sensed environmental information, including: a RF front-end circuit, which may receive and process RF input signals to generate a distance detection signal and a control instruction and power-on signal; a power control circuit, which may accept the control of the control instruction and power-on signal to supply a DC regulation voltage; an analog front-end detection circuit, which may receive the DC regulation voltage to start the function that receives the sensing environmental signal carrying the environmental information and outputs a digital environmental signal; and a baseband signal processor, which may receive the DC regulation voltage to receive the distance detection signal and the control instruction and power-on signal for outputting a demodulation control signal to the RF front-end circuit and outputting a power-off signal to the power control circuit, and receive and process the digital environmental signal for outputting an impedance control signal carrying the environmental information.

The RF front-end circuit may provide: a charge pump, which may convert the RF input signal into a DC signal; an amplitude shift keying demodulation circuit, which may receive and process the DC signal and the demodulation control signal to output the control instruction and power-on signal; and a distance digital converter, which may detect the internal voltage in the charge pump to produce the distance detection signal. The methods that are used by the amplitude shift keying demodulation circuit to generate the control instruction and power-on signal may include communication demodulation techniques of amplitude shift keying (ASK), phase shift keying (PSK), or frequency shift keying (FSK) etc.

The power control circuit may include: a start circuit, which receives the control instruction and power-on signal and the power-off signal to generate a power disable/enable signal for turning off or on other circuit components to utilize power efficiently; a digital voltage regulation circuit, which is used to receive the power disable/enable signal to generate or stop the DC regulation voltage; and an analog voltage regulation circuit, which is used to receive the power disable/enable signal to generate or stop the DC regulation voltage. The power control circuit may further include a cell, which is used to provide power for the digital voltage regulation circuit and the analog voltage regulation circuit to generate the DC regulation voltage. The digital voltage regulation circuit or the analog voltage regulation circuit may have a circuit structure such as low drop linear voltage regulation circuit or switching voltage regulation circuit etc. used to generate DC regulation voltage. The power control circuit may further include a digital reset circuit, which is used to generate a reset signal for resetting digital memory elements in the baseband signal processor or other circuit modules.

The analog front-end detection circuit may include: a front-end amplifier, which is used to receive and amplify a sensed environmental signal to generate an amplified sensing signal; an analog filter, which is used to receive and filter the amplified sensing signal to generate a filtered signal; a back-end amplifier, which is used to receive and amplify the filtered signal for generating an amplified filtered signal; and an analog to digital converter, which is used to convert the amplified filtered signal into a digital environmental signal. The analog filer may be designed with the structures, such as low pass filter, high pass filter, band pass filter or band rejection filter. The front-end amplifier or the back-end amplifier may belong to a structure of open loop amplifier or closed loop amplifier. The analog filter may further belong to continuous time process circuit or discrete time process circuit. The analog to digital converter may be designed by utilizing structure of single-slope converter, dual-slope converter, charge redistribution converter, continuously successive approximation converter or sigma delta data converter.

The baseband signal processor may include: a pulse generator, which is used to generate a pulse signal as the clock signal necessary for circuits to operate; a pulse interval encoding decoder which is used to input the control instruction and power-on signal and the pulse signal for generating a decoding signal; an instruction decoder, which is used to input the decoding signal for generating an instruction determination signal; a five-bit cyclic redundancy check (CRC) comparison circuit, which is used to input and error detect the decoding signal for generating a check comparison signal; a core finite state machine (FSM), which is used to input the distance detection signal, the instruction determination signal and the check comparison signal for generating the demodulation control signal, power-off signal, a divisor signal, a memory selection signal, a handshaking control signal and a memory access indication signal; a returning frequency divider, which is used to receive the divisor signal and the pulse signal for generating a frequency divided pulse; a pseudo random number generator, which is used to receive the handshaking signal for generating a handshaking signal; a multiplexer, which is used to receive the memory selection signal for transmitting memory reading data and memory writing data; a memory circuit, which is used to receive and store the memory writing data and output the memory reading data; a memory writing finite state machine, which is used to receive the digital environmental signal and the memory access indication signal for outputting the memory writing data; a memory reading finite state machine, which is used to receive the frequency divided pulse, the handshaking signal, the memory access indication signal and the memory reading data and output a serial reading data; and a FM0 encoder, which is used to input and execute FM0 encoding for the serial reading data to output the impedance control signal based on the frequency divided pulse.

The memory circuit may include a first memory and a second memory, which are used for the memory writing data to be written in and the memory reading data to be read out alternatively. The memory circuit may be composed of any memory that can store data, such as static random access memories, dynamic random access memories or electrically programmable memories etc.

The baseband signal processor in the core module may have a structure of the RFID communication protocol, Generation 2, Class 1, and may also be structured with any other communication protocol, for example near field communication (NFC) structure or RFID structure of another class and another generation, that may transmit the environmental information.

Compared to conventional techniques, the baseband signal processor in the wireless sensing system of the invention improves the data transmission performance for the data to be transmitted more stably because of the five-bit cyclic redundancy check comparison circuit and the FM0 encoder, which contribute to the reduction of the error rate of the environmental information. Moreover, conventional wireless communication chips must be configured with power amplifier to transmit wireless waves. However, the invention can transmit wireless waves for delivery of the environmental information without any power amplifier, such that the circuit design is simplified and the yield for circuit manufacturing is improved. Additionally, with the design of the power control circuit, the invention can avoid unnecessary power consumption and achieve the purpose of energy saving & environmental protection and long service life.

DETAILED DESCRIPTION OF THE PREFERRED EMBODIMENT

The technical content of the invention will be explained with specific embodiments below. Those skilled in the art may understand easily other advantages and effects of the invention from the content disclosed in the specification. The invention may also be implemented or applied by other different embodiments. Each detail in the specification may also be modified and varied based on different perspectives and applications without departing from the spirit of the invention.

One example of the invention is to provide a core module for a wireless sensing system according to the RFID communication protocol, generation 2, class 1 (hereinafter referred also as "communication protocol") used to deliver sensed environmental information to a remote reader through wireless transmission method, and implement power management mechanism and error detection function in a system on chip such that the invention achieves effects of compactness, power saving and error detection etc. The environmental information refers to the location information of the wireless sensing system, for example indoor temperature information, ambient pressure information, or human physiological information such as heartbeat etc., but not limited hereto. The environmental information stated herein includes any information capable of being extracted by sensors.

As for the wireless sensing system for long-term physiological monitoring system, for example, the wireless sensing system stated in the invention may adopt active RFID architecture, passive RFID architecture or semi-active RFID architecture. The active RFID architecture contains a cell, which consumes circuit power considerably, such that the service time cannot be long enough for long-term physiological monitoring system. The passive RFID architecture does not contain any cell such that a reader needs considerably large transmission power that is hazardous to human body in long-term physiological monitoring. Thus, the wireless sensing system of the passive RFID architecture is not suitable for long-term use. As for the semi-active RFID architecture, a reader can awaken circuits for reading physiological information without high power transmission. Therefore, compared to other RFID architectures, the semi-active RFID architecture does not hurt human body relatively. Besides, whenever it is unnecessary to read the physiological information, circuits in the semi-active RFID architecture may be in power saved sleeping status to further extend system service time without frequent cell replacement or to use a button cell. Hence, the invention may adopt the semi-active RFID architecture that is suitable for portable or wearable system.

Figure 1:
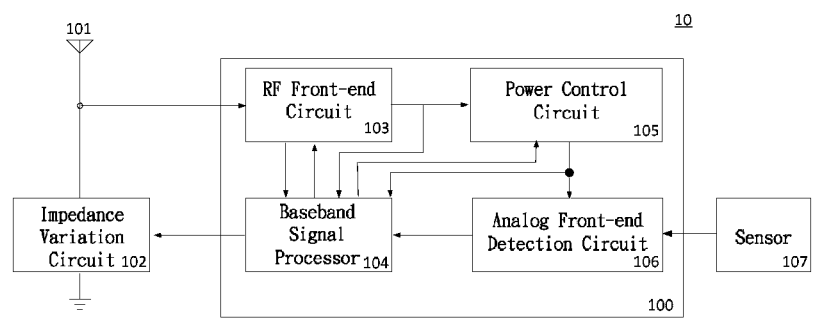
FIG. 1 is a block diagram showing the structure of a system on chip (SOC) according to an embodiment of the invention.

The system may utilize the miniaturization technique of system on chip to reduce volume under the condition of performance compliance such that the effect of compactness and usefulness. Refer to FIG. 1, which is a block diagram showing the structure of a system on chip (SOC) according to an embodiment of the invention. The SOC is a wireless sensing system, which may receive the sensed environmental information, for example physiological information, extract and process the environmental information, and further transmit the environmental information to the reader. In FIG. 1, the wireless sensing system is implemented as a system on chip 10, which includes a core module 100, a RFID antenna 101, an impedance variation circuit 102, and a sensor 107. The RFID antenna 101 receives a RF input signal carrying a control instruction from a remote reader (not shown). The sensor 107 extracts environmental information and outputs a sensed environmental signal. The core module 100 inputs and processes the sensed environmental signal output from the sensor 107 according to the control instruction carried on the RF input signal to generate and provide an impedance control signal carrying the environmental information to the impedance variation circuit 102. The impedance variation circuit 102 adjusts internal impedance thereof according to the impedance control signal. The RFID antenna 101 varies the electromagnetic wave reflected back to the reader according to the variation of the internal impedance in the impedance variation circuit 102. The reader demodulates the environmental information to be delivered by the system on chip 10 based on variation of the electromagnetic wave. The impedance variation circuit 102 may input the impedance control signal with, for example, a single bit to vary the internal impedance of the impedance variation circuit 102 by the variation of the voltage level of the impedance control signal, and thereby adjust the reflection coefficient of the RFID antenna 101, such that the magnetic wave from the reader is reflected with bit message in the environmental information on the basis of variation of the reflection coefficient. The reader interprets the environmental information transmitted by the system on chip 10 by the received bit message. Therefore, the system on chip 10 does not need use any power amplifier to transmit the electromagnetic wave, such that the power consumption of the entire system on chip may be reduced to extend the power service time. Empirically, the system on chip of the invention may service for more than 5 years, and have the longest service life among existing wireless physiological signal detection products.

The core module 100 includes a RF front-end circuit 103, a baseband signal processor 104, a power control circuit 105 and an analog front-end detection circuit 106. The RF front-end circuit 103 is used to receive the RF input signal carrying the control instruction sent from the RFID antenna 101, convert the RF input signal from AC form into DC form, then perform emission distance detection to generate the distance detection signal, and perform digital demodulation to generate the control instruction and power-on signal, wherein the distance detection signal carries distance information between the reader and the system on chip 10, and the control instruction and power-on signal carries power-on information for carrying the control instruction used to guide operation of the system on chip 10 and for starting the system on chip 10. The power control circuit 105 receives the control instruction and power-on signal from the RF front-end circuit 103 to generate DC regulation voltage for electronic elements in the system on chip 10. The DC regulation voltage may be divided into a digital DC regulation voltage used for digital electronic elements and an analog DC regulation voltage used for analog electronic elements. The analog front-end detection circuit 106 starts to receive the sensed environmental signal carrying the environmental information from the sensor 107 once it receives the DC regulation voltage from the power control circuit 105, and processes the sensed environmental signal to generate a digital environmental signal for the baseband signal processor 104.

The baseband signal processor 104 starts to receive the distance detection signal from the RF front-end circuit 103, interpret the distance between the reader and the system on chip 10, and generate and feedback a demodulation control signal carrying the distance information to the RF front-end circuit 103 once it receives the DC regulation voltage from the power control circuit 105, such that the RF front-end circuit 103 may interpret the data from the reader. Additionally, the baseband signal processor 104 may also receive the control instruction and power-on signal from the RF front-end circuit 103, and perform encoding process according to the control instruction carried on the control instruction and power-on signal and the digital environmental signal from the analog front-end detection circuit 106 to generate the impedance control signal for adjusting the internal impedance of the impedance variation circuit 102. By adjusting the internal impedance of the impedance variation circuit 102, the reflective property of the electromagnetic wave with respect to the RFID antenna 101 may be varied, and a reflective electromagnetic signal reflected from the RFID antenna 101 to the reader may be varied, such that the reader can interpret the environmental signal smoothly according to the variation of the reflective electromagnetic signal reflected back to the reader. Moreover, the reader may transmit the control instruction of a stopping sensing requirement to the system chip 10. The baseband 104 may also send a power-off signal to the power control circuit 105 to stop the operation of the system on chip 10 according to the stopping sensing requirement and achieve the purpose of power saving.

Figure 2:
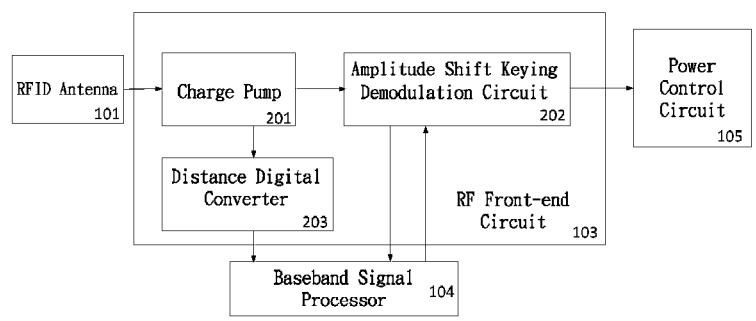
FIG. 2 is a block diagram showing the structure of a RF front-end circuit according to an embodiment of the invention.

The electromagnetic signal received by the RFID antenna 101 is weak and cannot be used for information interpretation directly. Therefore, before interpretation the information carried on the electromagnetic signal, the RF front-end circuit 103 may process the received electromagnetic signal in advance. Refer to FIG. 2, which is a block diagram showing the structure of a RF front-end circuit according to an embodiment of the invention. In FIG. 2, the RF front-end circuit 103 includes a charge pump 201, an amplitude shift keying demodulation circuit 202 and a distance digital converter 203. The charge pump 201 converts the RF input signal from the form of AC signal to the form of DC signal and sends to the amplitude shift keying demodulation circuit 202 for demodulation. The amplitude shift keying demodulation circuit 202 generates the control instruction and power-on signal according to the DC signal and the demodulation control signal from the baseband signal processor 104 to start the power control circuit 105 and provide the control instruction to the baseband signal processor 104 for the process of the environmental information. The distance digital converter 203 detects internal voltage of the charge pump to generate the distance detection signal for the baseband signal processor 104 to interpret wireless transmission distance and feedback the demodulation control signal. The method that the amplitude shift keying demodulation circuit 202 uses to generate the control instruction and power-on signal may include amplitude shift keying (ASK), phase shift keying (PSK), or frequency shift keying (FSK).

Figure 3:
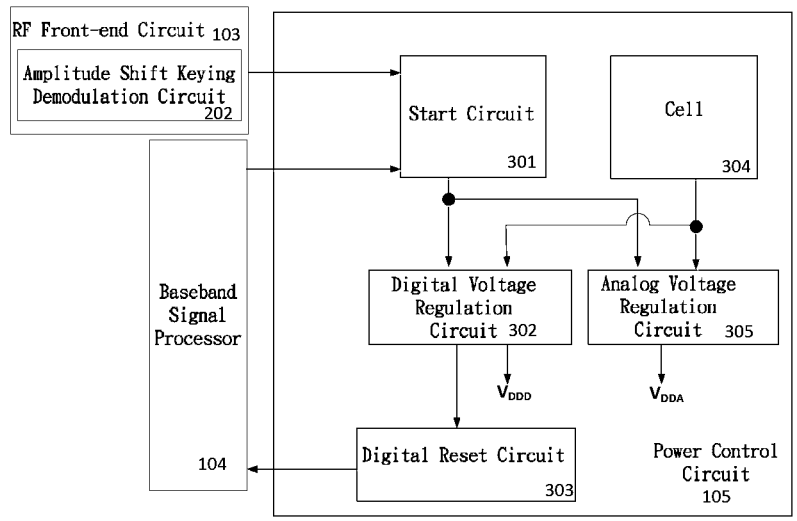
FIG. 3 is a block diagram showing the structure of a power control circuit according to an embodiment of the invention.

To save energy consumption and extend service life, the core module 100 is configured with a circuit for providing power management mechanism. Refer to FIG. 3, which is a block diagram showing the structure of a power control circuit according to an embodiment of the invention. In FIG. 3, the power control circuit 105 includes primarily a start circuit 301, a digital voltage regulation circuit 302 and an analog voltage regulation circuit 305. The control instruction and power-on signal from the RF front-end circuit 103 may drive the start circuit 301. The start circuit 301 generates a power disable/enable signal according to the control instruction carried on the control instruction and power-on signal to determine whether to start the digital voltage regulation circuit 302 and the analog voltage regulation circuit 305. The power-off signal from the baseband signal processor 104 may also drive the start circuit 301 to generate the power disable/enable signal to turn off the power of the system on chip 10. The power control circuit 105 may further include a cell 304. The cell 304 may provide power for the digital voltage regulation circuit 302 and the analog voltage regulation circuit 305 to generate the DC regulation voltage. As the start circuit 301 does not drive to start the digital voltage regulation circuit 302 and the analog voltage regulation circuit 305, the digital voltage regulation circuit 302 and the analog voltage regulation circuit 305 are in off status to save power. As the start circuit 301 drives to start the digital voltage regulation circuit 302 and the analog voltage regulation circuit 305, the digital voltage regulation circuit 302 and the analog voltage regulation circuit 305 may process the power from the cell 304 separately to generate the digital DC regulation voltage and the analog DC regulation voltage for digital elements and analog elements in the system on chip 10 to use, respectively. However, the cell 304 is not necessary, those skilled in the art has know that there are many technologies capable of generating the power necessary for the system on chip 10 to operate, for example the Wireless Power technique specified by WPC (Wireless Power Consortium). The start circuit 301 may further receive the power-off signal from the baseband signal processor 104 to turn off the digital voltage regulation circuit 302 and the analog voltage regulation circuit 305, such that the effect of active power saving may be achieved. The power control circuit 105 may further include a digital reset circuit 303, the digital reset circuit 303 generates a reset signal to reset digital memory elements, for example registers or latches, but not limited hereto, in the baseband signal processor 104 once it receives the DC regulation voltage supplied by the digital voltage regulation circuit 302 for the baseband signal processor 104 to operate smoothly. However, if the design of the digital memory elements in the baseband signal processor 104 uses a powering to reset method, that is, the digital memory elements are reset at first once powered on before normal operation, the reset signal may be unnecessary. That is, the digital reset circuit 303 in the power control circuit 105 is not a mandatory component in the invention.

Note that the digital regulation voltage and the analog regulation analog may be designed to be the same DC regulation voltage. Therefore, the digital voltage regulation circuit 302 and the analog voltage regulation circuit 305 may be an identical circuit to minimize the area of the system on chip 10. The design of the digital voltage regulation circuit 302 or the analog voltage regulation circuit 305 may be low drop linear voltage regulation circuit or switching voltage regulation circuit, but not limited hereto.

Figure 4:
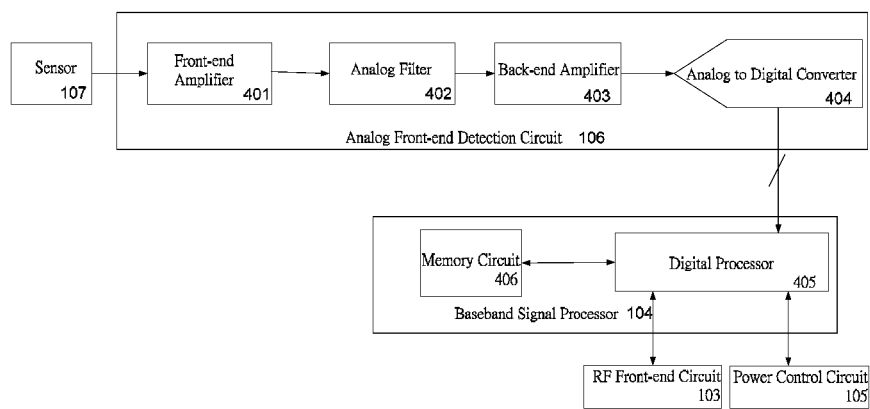
FIG. 4 is a block diagram showing the structure of an analog front-end detection circuit according to an embodiment of the invention.

A sensed signal output by the sensor 107 may have noise and be weak to be processed in advance before the environmental information is extracted. Refer to FIG. 4, which is a block diagram showing the structure of an analog front-end detection circuit according to an embodiment of the invention. In FIG. 4, the analog front-end detection circuit 106 includes a front-end amplifier 401, an analog filter 402, a back-end amplifier 403 and an analog to digital converter 404. The analog front-end detection 106 starts to operate once the DC regulation voltage is received from the power control circuit 105. Because the sensed environmental signal from the sensor 107 may be a weak signal, the sensed environmental signal is processed with the first signal amplification through the front-end amplifier 401 to generate an amplified sensing signal for subsequent circuits to process the environmental information. Different environmental information are ranged in different bands in the spectrum. Therefore, the analog filter 402 is used to filter the amplified sensing signal for removing unnecessary noise and extracting a filtered signal from the band that the environmental information occupies. The filtered signal is processed with the second signal amplification by the back-end amplifier 403 to meet the dynamic range necessary for the analog to digital converter 404 to process, and is converted into the digital environmental signal by the analog to digital converter 404 for the baseband signal processor 104 to perform digitalization process.

The design of the analog filter 402 may include low pass filter, high pass filter, band pass filter, band rejection filter or the combination thereof, such as series combination, but not limited hereto. The design of the front-end amplifier 401 or the back-end amplifier 403 may include open loop amplifier or closed loop amplifier, but not limited hereto. The design of the analog filter 402 may be continuous time process circuit or discrete time process circuit, but not limited hereto. The design of the analog to digital converter 404 may be single-slope converter, dual-slope converter, charge redistribution converter, continuously successive approximation converter or sigma delta data converter, but not limited hereto.

Figure 5:
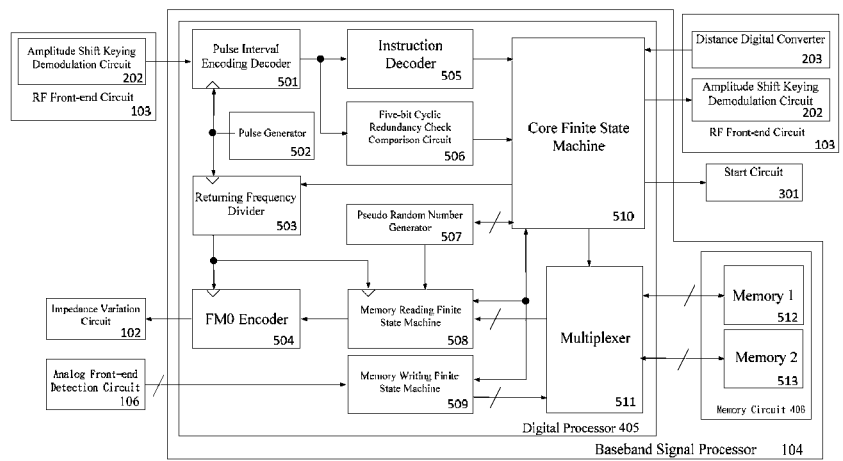
FIG. 5 is a block diagram showing the structure of a baseband signal processor according to an embodiment of the invention.

The wireless communication may be distorted due to the interference of channel noise. Channel coding may improve the accuracy of signal transmission effectively. The channel encoding may be, for example, cyclic redundancy check (CRC) encoding and FM0 encoding. Refer to FIG. 5, which is a block diagram showing the structure of a baseband signal processor according to an embodiment of the invention. In FIG. 5, the baseband signal processor 104 has a digital processor 405 and a memory circuit 406 used for processing and storing digital signals, respectively.

The digital processor 405 includes a pulse generator 502, a pulse interval encoding decoder 501, an instruction decoder 505, a five-bit cyclic redundancy check comparison circuit 506, a core finite state machine 510, a returning frequency divider 503, a pseudo random number generator 507, a multiplexer 511, a memory writing finite state machine 509, a memory reading finite state machine 508 and a FM0 encoder 504. The baseband 405 starts to operate once the DC regulation voltage supplied by the power control circuit 105 is received. For the system on chip 10 in the invention, the power control circuit 105, which contains the digital reset circuit 303, may provide the reset signal to the baseband signal processor 104 and reset the digital memory elements in the digital processor 405 once it supplies the DC regulation voltage. However, the reset signal may be unnecessary if the design of the digital memory elements in the baseband signal processor 405 is the powering to reset method as mentioned above.

The pulse generator 502 generates a pulse signal to provide the clock source necessary for triggering the digital memory elements. The pulse interval encoding decoder 501 receives the pulse signal and the control instruction and power-on signal from the RF front-end circuit 103 to generate a decoding signal with the control instruction. The instruction decoder 505 inputs the decoding signal, interprets the control instruction carried on the decoding signal and generates an instruction determination signal, which is sent to the core finite state machine 510. A five-bit cyclic redundancy check comparison circuit 506 is used to input the decoding signal and perform a five-bit cyclic redundancy check algorithm to compare and detect whether the decoding signal meets the requirement of the communication protocol. The five-bit cyclic redundancy check comparison circuit 506 may further generate a check comparison signal carrying the compared or detected result and send the check comparison signal to the core finite state machine 510.

Although the five-bit cyclic redundancy check comparison circuit 506 is used to perform the five-bit cyclic redundancy check algorithm in the embodiment, other channel encoding/decoding circuit may be used to replace the five-bit cyclic redundancy check comparison circuit 506 instead to meet corresponding communication protocols if the applied communication protocol is upgraded or changed.

The core finite state machine 510 is used to input the instruction determination signal, the check comparison signal and the distance detection signal from the RF front-end circuit 103 to generate the demodulation control signal, the power-off signal, a divisor signal, a memory selection signal, a handshaking control signal and a memory access indication signal. The demodulation control signal is sent to the RF front-end circuit 103 for the RF front-end circuit 103 to interpret accurately the control instruction delivered by the reader. The power-off signal is sent to the power control circuit 105 to turn off power supply when the control instruction requests to turn off the wireless sensing system 10 or there is no control instruction to request for transmitting the sensed environmental information such that the effect of power saving is achieved. The divisor signal is sent to the returning frequency divider 503 for adjusting the period of the pulse signal. The memory selection signal is sent to the multiplexer 511 for controlling reading and writing behaviors of the memory circuit 406. The handshaking control signal is sent to and used for controlling the pseudo random number generator 507. The memory access indication signal is sent to the memory reading finite state machine 508 and the memory writing finite state machine 509 to control data flows read from and written into the memory circuit 406 through the multiplexer 511, respectively.

The returning frequency divider 503 adjusts the period of the pulse signal according to the divisor signal to output a frequency divided pulse necessary for the returning signal specified in the communication protocol. The pseudo random number generator 507 generates 16-bit random number data according to the handshaking control signal as a handshaking signal necessary for the connection linked between the system on chip 10 and the reader. The multiplexer 511 receives the memory selection signal to control data access direction of the memory circuit 406 for receiving memory reading data from the memory circuit 406 and sending memory writing data to the memory circuit 406.

The memory circuit 406 may have two data access ports capable of data access for data input and data output to work simultaneously. In the embodiment, the memory circuit 406 consists of a first memory 512 (memory 1) and a second memory 513 (memory 2). The first memory 512 and the second memory 513 each has one data access pot. The multiplexer 511 drives the first memory 512 and the second memory 513 to perform actions of data input and data output alternatively through the data access ports according to the memory selection signal. For example, when the core finite state machine 510 requests the first memory 512 to perform data input and the second memory 513 to perform data output, once the first memory 512 has been filled with data fully, the core finite state machine 510 changes to drive the multiplexer 511 to request the first memory 512 to perform data output and the second memory 513 to perform data input. After that, once the second memory 513 has been filled with data fully, the core finite state machine 510 changes again to drive the multiplexer 511 to request the first memory 512 to perform data input and the second memory 513 to perform data output. The data access operation of the multiplexer 511 with respect to the first memory 512 and the second memory 513 is recursively by this way.

The memory writing finite state machine 509 inputs the digital environmental signal from the analog front-end detection circuit 106 according to the memory access indication signal from the core finite state machine 510. The memory access indication signal is sent together with memory address data generated sequentially by the memory writing finite state machine 509 to the multiplexer 511 for writing the digital environmental signal into the corresponding memory address. The memory reading finite state machine 508 receives the digital environmental signal stored in the memory circuit 406 from the multiplexer 511 according to the memory access indication signal from the core finite state machine 510 on the basis of the frequency (or period) provided by the frequency divided pulse from the output of the returning frequency divider 503, converts the digital environmental signal into a serial reading data with the handshaking signal provided by the pseudo random number generator 507, and outputs the serial reading data to the FM0 encoder 504. The FM0 encoder 504 processes the serial reading data with the FM0 encoding required by the communication protocol on the basis of the frequency provided by the returning frequency divider 503 to generate the impedance control signal, and sends the impedance control signal to the impedance variation circuit 102 to vary the internal impedance of the impedance variation circuit 102 such that the environmental information is transmitted to the reader through the RFID antenna 101.

The memory circuit 406 may include a dual-port memory with the capability of simultaneous reading and writing without needing two memories for separate reading and writing. The memory in the memory circuit 406 may be static random access memory, dynamic random access memory, electrically programmable memory or any volatile, non-volatile or other memory, such as Flash memory, magnetic random access memory (MRAM), ferroelectric random access memory (FRAM) or phase-change random access memory (PRAM) etc., but not limited hereto.

In FIG. 5, although the signal sent to the FM0 encoder 504 by the memory reading finite state machine 508 is in serial form, signals transmitted between functional blocks in the system on chip 10 may also be in parallel form. That is, the signal transmission in the invention should not be confined to any transmission form, such as serial or parallel form.

Figure 6:
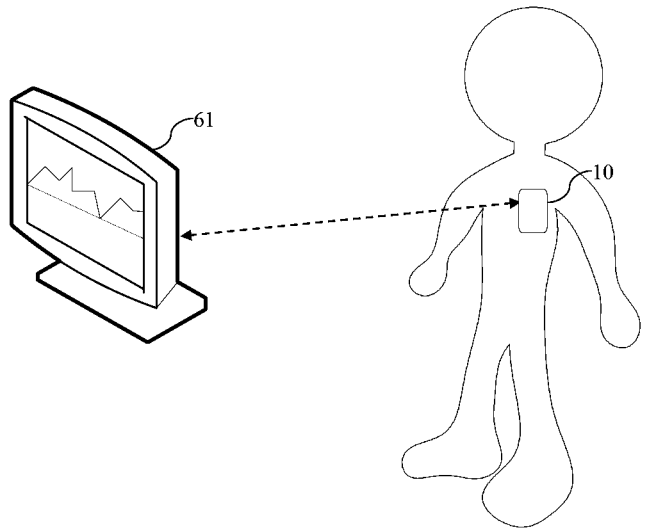
FIG. 6 is a schematic view showing a wireless sensing system for physiological heartbeat detection according to an embodiment of the invention.

The invention may be applied to the heartbeat detection of human body. Refer to FIG. 6, which is a schematic view showing a wireless sensing system for physiological heartbeat detection according to an embodiment of the invention. In FIG. 6, the wireless sensing system may be composed by the system on chip 10 as stated above and a reader 61. The system on chip 10 may be formed as a RFID tag to be attached to the heartbeat portion on a patient. A caregiver operates the reader 61 to emit an electromagnetic wave carrying a control instruction for requesting the system on chip 10 to read and transmit the physiological information with heartbeat content. Once the system on chip 10 accepts the control instruction, it senses and processes the physiological information and reflects the electromagnetic wave emitted by the reader 61 according to the physiological information. At this moment, the electromagnetic wave reflected back to the reader 61 carries the physiological information. Once the reader 61 accepts the reflected electromagnetic wave, it interprets the physiological information returned by the system on chip 10 according to the electromagnetic wave that carries the physiological information and display the result to complete the operation of the wireless sensing system. The reader 61 may be a watch, smart phone, PDA (Personal Digital Assistant), computer, set top box etc., but not limited hererto The specification has disclosed in detail that the system on chip designed by the invention may have advantages of compactness, power saving and error detection etc. The core module of the system on chip is designed based on the RFID communication protocol, Generation 2, Class 1 in the embodiment. It is apparent that those skilled in the art may utilize other communication protocols and circuit structures to implement the invention without departing from the spirit and scope within the invention. For example, communication technologies such as the near field communication (NFC) or far field communication (FFC) etc. may also be utilized to implement the invention. Thus, simple modifications for communication protocols or circuit structures of the invention should all be included in the protective scope of the invention.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. A core module for wireless sensing system used to receive, process and output a sensed environmental information, wherein a sensor extracts environmental information and outputs a sensed environmental signal, including:
    a RF front-end circuit, which is used to receive and process a RF input signal to generate a distance detection signal and a control instruction and power-on signal;
    a power control circuit, which accepts the control of said control instruction and power-on signal to supply a DC regulation voltage;
    an analog front-end detection circuit, which receives said DC regulation voltage and starts the function of receiving said sensed environmental signal that carries said sensed environmental information and output a digital environmental signal; and
    a baseband signal processor, which receives said DC regulation voltage to receive said distance detection signal and said control instruction and power-on signal for outputting a demodulation control signal to said RF front-end circuit and outputting a power-off signal to the power control circuit, and receives and processes said digital environmental signal to output an impedance control signal that carries said sensed environmental information,
    wherein said baseband signal processor includes:
    a pulse generator, which generates a pulse signal;
    a pulse interval encoding decoder, which inputs said control instruction and power-on signal and said pulse signal to generate a decoding signal;
    an instruction decoder, which inputs said decoding signal to generate an instruction determination signal;
    a five-bit cyclic redundancy check comparison circuit, which inputs and error detects said decoding signal to generate a check comparison signal;
    a core finite state machine, which inputs said distance detection signal, said instruction determination signal and said check comparison signal to generate said demodulation control signal, said power-off signal, a divisor signal, a memory selection signal, a handshaking control signal and a memory access indication signal;
    a returning frequency divider, which receives said divisor signal and said pulse signal to output a frequency divided pulse;
    a pseudo random number generator, which receives said handshaking control signal to generate a handshaking signal;
    a multiplexer, which receives said memory selection signal to transmit memory reading data and memory writing data;
    a memory circuit, which is used to receive and store said memory writing data and to output said memory reading data;
    a memory writing finite state machine, which receives said digital environmental signal and said memory access indication signal to output said memory writing data;
    a memory reading finite state machine, which receives said frequency divided pulse, said handshaking signal, said memory access indication signal and said memory reading data and outputs a serial reading data; and
    a FM0 encoder, which inputs and performs FM0 encoding for said serial reading data to output said impedance control signal on the basis of said frequency divided pulse.

2. The core module according to claim 1, wherein said RF front-end circuit includes:
    a charge pump, which converts said RF input signal into a DC signal;
    an amplitude shift keying demodulation circuit, which receives and processes said DC signal and said demodulation control signal to output said control instruction and power-on signal; and
    a distance digital converter, which detects an internal voltage of said charge pump to generate said distance detection signal.

3. The core module according to claim 2, wherein methods that said amplitude shift keying demodulation circuit generates said control instruction and power-on signal include amplitude shift keying (ASK), phase shift keying (PSK), or frequency shift keying (FSK).

4. The core module according to claim 3, wherein said DC regulation voltage is divided into a digital DC regulation voltage for digital electronic elements and an analog DC regulation voltage for analog electronic components; said power control circuit includes:
    a start circuit, which receives said control instruction and power-on signal and said power-off signal to generate a power disable/enable signal;
    a digital voltage regulation circuit, which receives said power disable/enable signal to generate or stop said digital DC regulation voltage; and
    an analog voltage regulation circuit, which receives said power disable/enable signal to generate or stop said analog DC regulation voltage.

5. The core module according to claim 4, further including a cell or a digital reset circuit, wherein said cell is used to provide power for said digital voltage regulation circuit and said analog voltage regulation circuit to generate said DC regulation voltage; said digital reset circuit is used to generate a reset signal for resetting digital memory elements in said baseband signal processor; wherein said digital voltage regulation circuit or said analog voltage regulation circuit is low drop linear voltage regulation circuit or switching voltage regulation circuit.

6. The core module according to claim 1, wherein said analog front-end detection circuit includes:
- a front-end amplifier, which receives and amplifies said sensed environmental signal and generate an amplified sensing signal;
- an analog filter, which receives and filters said amplified sensing signal to generate a filtered signal;
- a back-end amplifier, which receives and amplifies said filtered signal to generate an amplified filtered signal; and
- an analog to digital converter, which converts said amplified filtered signal into said digital environmental signal.

7. The core module according to claim 6, wherein said analog filter is a low pass filter, a high pass filter, a band pass filter, a band rejection filter or the combination of above filters; said front-end amplifier or said back-end amplifier is an open loop amplifier or a closed loop amplifier; said analog filter is a continuous time process circuit or a discrete time process circuit; said analog to digital converter is a single-slope converter, a dual-slope converter, a charge redistribution converter, a continuously successive approximation converter or a sigma delta data converter.

8. The core module according to claim 1, wherein said memory circuit includes a first memory and a second memory, which are used for writing said memory writing data and reading said memory reading data; said memory circuit is composed of a static random access memory, a dynamic random access memory or an electrically programmable memory.

9. The core module according to claim 1, wherein said baseband signal processor has a structure of RFID communication protocol, Generation 2, Class 1.

* * * * *